United States Patent
Borkenhagen et al.

(10) Patent No.: US 9,984,023 B2
(45) Date of Patent: May 29, 2018

(54) MULTI-SERVER SYSTEM INTERCONNECT

(71) Applicant: Lenovo Enterprise Solutions (Singapore) Pte. Ltd., Singapore (SG)

(72) Inventors: John Michael Borkenhagen, Rochester, MN (US); Randolph Scott Kolvick, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 212 days.

(21) Appl. No.: 14/825,091

(22) Filed: Aug. 12, 2015

(65) Prior Publication Data
US 2017/0046291 A1    Feb. 16, 2017

(51) Int. Cl.
G06F 13/00    (2006.01)
G06F 13/38    (2006.01)
G06F 13/40    (2006.01)
G06F 13/42    (2006.01)

(52) U.S. Cl.
CPC .......... G06F 13/387 (2013.01); G06F 13/404 (2013.01); G06F 13/4282 (2013.01)

(58) Field of Classification Search
CPC .............................. G06F 13/387; G06F 13/404
See application file for complete search history.

(56) References Cited

U.S. PATENT DOCUMENTS

2014/0359267 A1* 12/2014 Moriki .................... G06F 9/441
                                                        713/2
2015/0319231 A1* 11/2015 Naouri .................... H04L 49/70
                                                        709/204

OTHER PUBLICATIONS

One Stop Systems Inc., "PCIe x16 Gen 3 Switch-based Cable Adapter," Product Information Page, retrieved from http://www.onestopsystems.com/sites/default/files/pdf/198-pcie_x16_3.0_switch_based.pdf, Apr. 2015, 2 pages.
One Stop Systems Inc., "PCIe x8 Gen 3 quad-port Cable Adapter," Product Information Page, retrieved from http://www.maxexpansion.com/sites/default/files/files/OSS-PCIe-HIB38-x8-QUAD%281%29.pdf, May 2015, 1 page.

* cited by examiner

Primary Examiner — Zachary K Huson
(74) Attorney, Agent, or Firm — Zilka-Kotab, P.C.

(57) ABSTRACT

A system according to one embodiment includes at least two socket servers each having a plurality of sockets, each socket being configured to receive a processor, and a plurality of adapters coupled to the serial computer expansion buses, the adapters being configured to enable communication between the processors of different ones of the socket servers. Each of the socket servers have at least one serial computer expansion bus coupled to each of the sockets thereof.

20 Claims, 12 Drawing Sheets

MULTI-SERVER SYSTEM INTERCONNECT

FIELD OF THE INVENTION

The present invention relates to server systems, and more particularly, this invention relates to direct interconnection between multi-socket server systems.

BACKGROUND

As user demand of the complexity of server systems increases, conventional servers may be limited in their ability to increase physical memory, while maintaining a high density and/or compact design. For example, some conventional server systems are limited to including up to a maximum of twelve terabytes of physical memory. This may prove limiting. Moreover, the server system may be limited to the amount of bandwidth that it may utilize e.g. during decoding tasks, during server access events, during server system tasks of a type known in the art, etc.

SUMMARY

A system according to one embodiment includes at least two socket servers each having a plurality of sockets, each socket being configured to receive a processor, and a plurality of adapters coupled to the serial computer expansion buses, the adapters being configured to enable communication between the processors of different ones of the socket servers. Each of the socket servers have at least one serial computer expansion bus coupled to each of the sockets thereof.

A system according to another embodiment includes at least two socket servers each having a plurality of sockets, each socket being configured to receive a processor. Each of the socket servers has at least one serial computer expansion bus coupled to each of the sockets thereof. A plurality of adapters are coupled to the serial computer expansion buses, the adapters being configured to enable communication between the processors of different ones of the socket servers. A first address range is assigned to each of the socket servers. A second address range is assigned to each of the adapters, the second address range being different than the first address range. The socket servers have identical physical address ranges.

Other aspects and advantages of the present invention will become apparent from the following detailed description, which, when taken in conjunction with the drawings, illustrate by way of example the principles of the invention.

DETAILED DESCRIPTION

Figure 1:
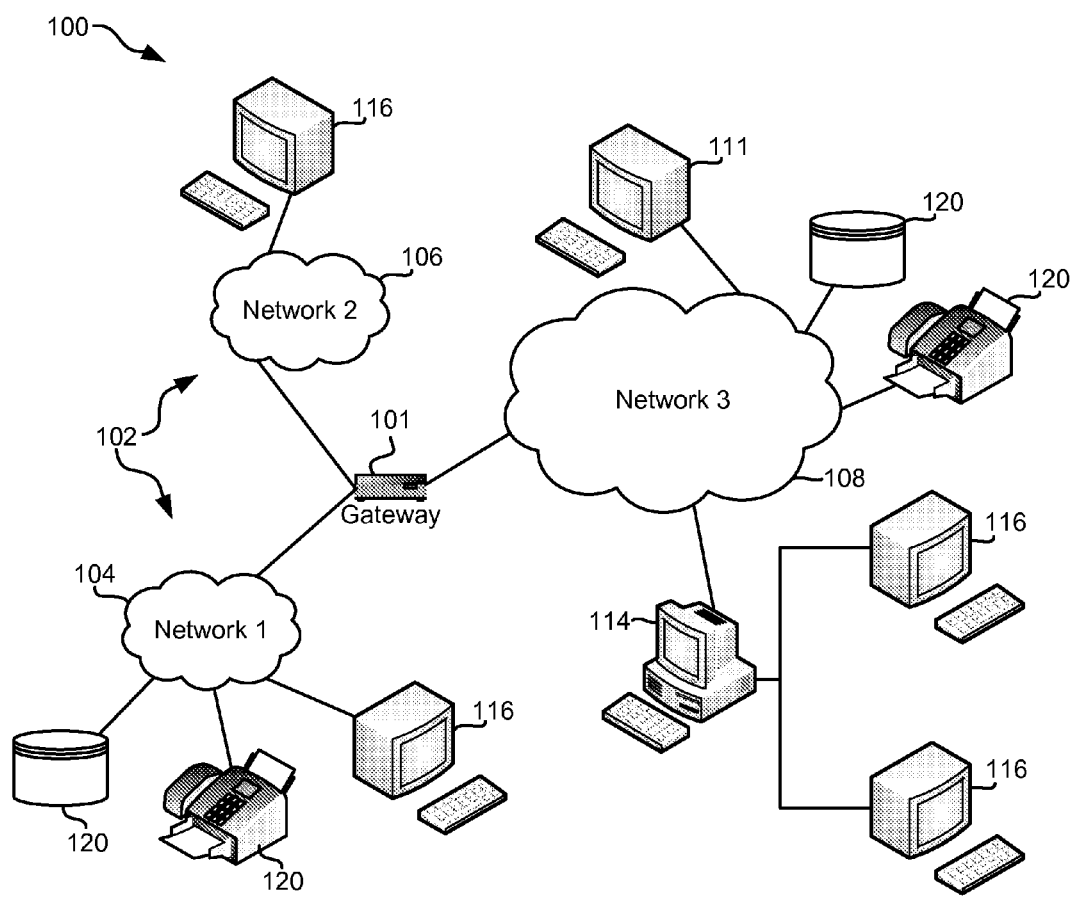
FIG. 1 is diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Embodiments described herein establish interconnections between multi-socket server combinations, thereby enabling condensed system environments with high bandwidth capabilities.

In one general embodiment, a system includes at least two socket servers each having a plurality of sockets, each socket being configured to receive a processor, and a plurality of adapters coupled to the serial computer expansion buses, the adapters being configured to enable communication between the processors of different ones of the socket servers. Each of the socket servers have at least one serial computer expansion bus coupled to each of the sockets thereof.

In another general embodiment, a system includes at least two socket servers each having a plurality of sockets, each socket being configured to receive a processor. Each of the socket servers has at least one serial computer expansion bus coupled to each of the sockets thereof. A plurality of adapters are coupled to the serial computer expansion buses, the adapters being configured to enable communication between the processors of different ones of the socket servers. A first address range is assigned to each of the socket servers. A second address range is assigned to each of the adapters, the second address range being different than the first address range. The socket servers have identical physical address ranges.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
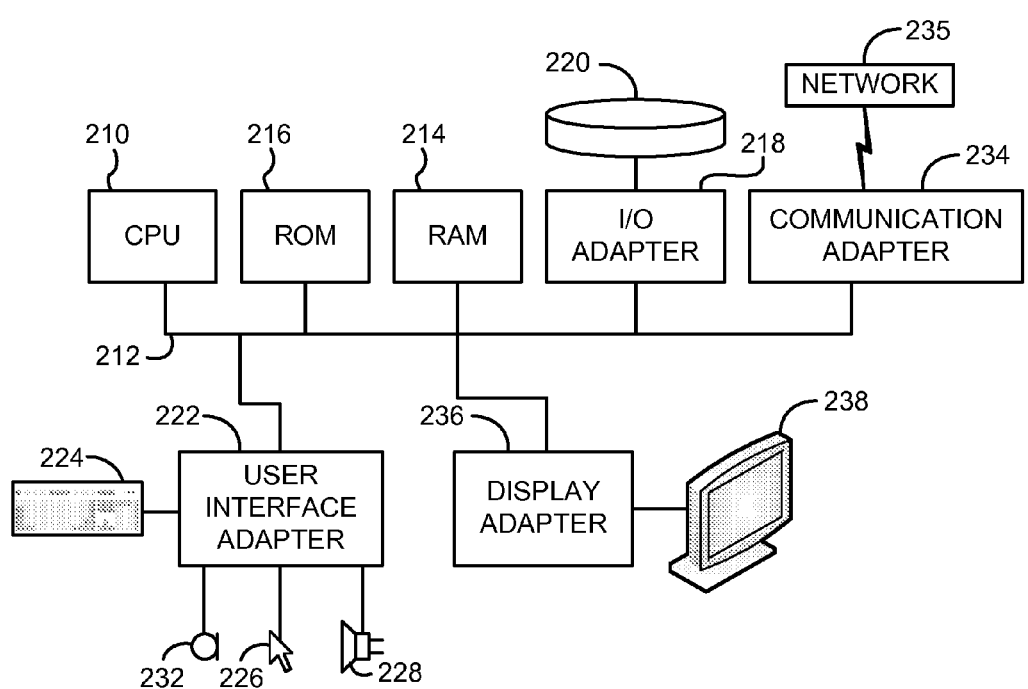
FIG. 2 is a diagram of a representative hardware environment that may be associated with the servers and/or clients of FIG. 1.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
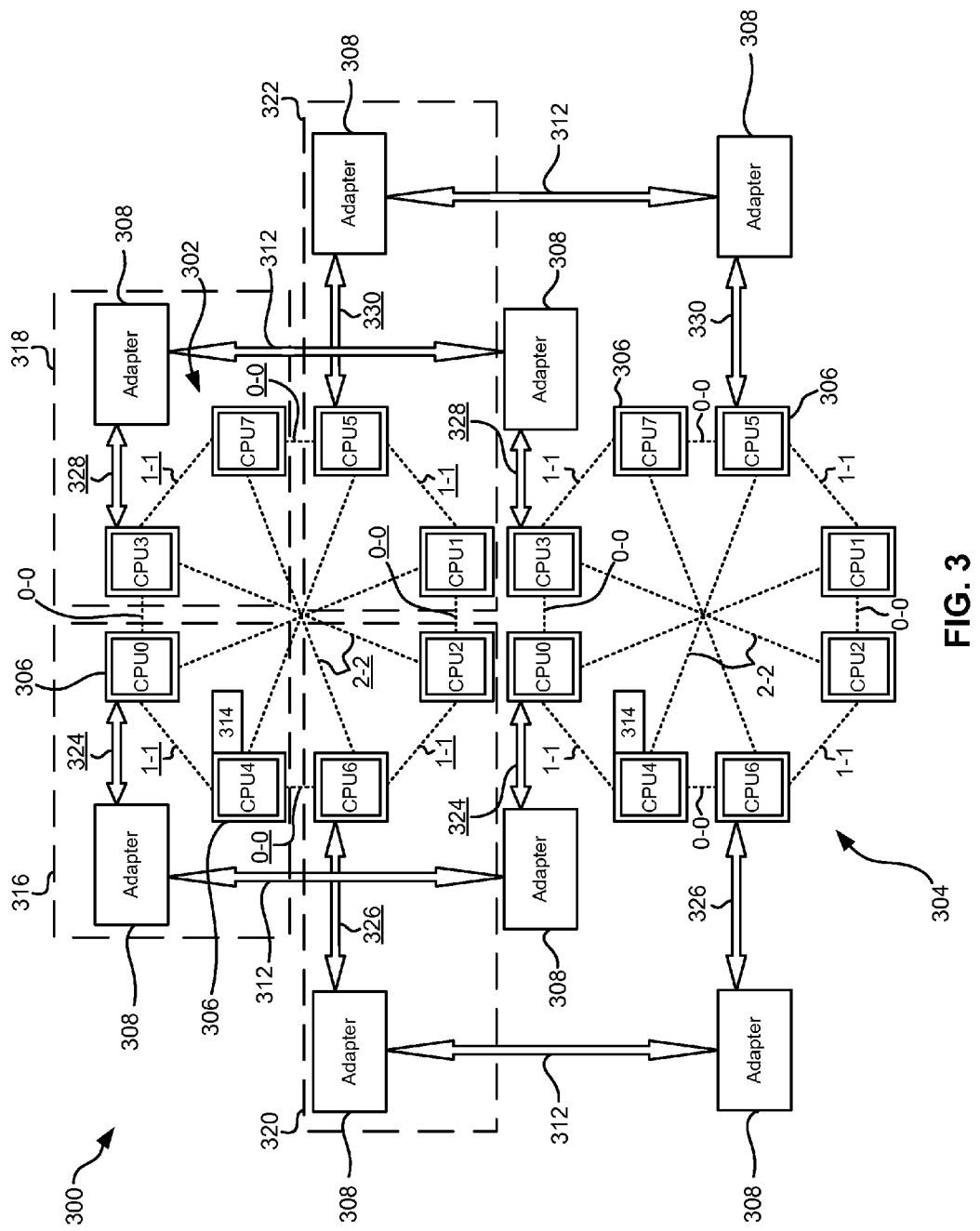
FIG. 3 is a representational diagram of a multi-socket server system architecture, in accordance with one embodiment.

FIG. 3 depicts a system 300 in accordance with one embodiment. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment.

System 300 is a socket server system architecture, in accordance with one embodiment. System 300 includes a first socket server 302 and a second socket server 304. According to various embodiments, a system 300 may include more than two socket servers 302, 304. See e.g., FIG. 6.

With continued reference to FIG. 3, each of the two or more socket servers 302, 304, may have a plurality of sockets 306. For example, the first socket server 302 and the second socket server 304 each include eight sockets in system 300, although according to other embodiments, the first socket server 302 and/or the second socket server 304 may include more or fewer sockets 306.

According to various embodiments, system 300 may support up to 12 terabytes of physical memory, and up to 64 terabytes of physical address space. It should be noted that the memory configurations and/or capacities described herein may vary depending on the embodiment.

The socket servers 302, 304 may be configured in an "8U" configuration, which may further be described as being 8 rack units high when implemented in a mid-chassis interconnect, as will be described in greater detail herein. According to various embodiments, each of the two or more socket servers 302, 304, may further include up to 192 double data rate type three (DDR3) and/or double data rate type four (DDR4) dual in-line memory modules (DIMMS). According to other embodiments, the memory module configuration and/or capacity included in embodiments described herein may vary. The socket servers in various embodiments may be of a type known in the art, and programmed to provide the functionality described herein.

It should be noted that the configuration of system 300 in FIG. 3, e.g., particularly the configuration of each socket server 302, 304, are shown to be in octagonal configurations, but should not be limited thereto. Accordingly, in further embodiments, each of the sockets 306 may be oriented in array orientations, e.g., in two by four arrays, in one by eight arrays, in arrays configured to receive socket extensions of a type known in the art, etc. Furthermore the orientations of the sockets 306 of socket servers 302, 304 may be vary from one another, depending on the preferred embodiment.

The octagonal socket configuration of system 300 may be preferred because it may advantageously reduce production cost and/or reduce the latency between the sockets 306.

It should further be noted that socket configurations which include more than eight sockets 306 may include a node controller of a type known in the art for socket to socket communication management.

Each of the sockets 306 of the socket servers 302, 304 may furthermore be configured to receive a processor of a type known in the art, e.g., illustrated as central processing units CPU 0, CPU 1, CPU 2, CPU 3, CPU 4, CPU 5, CPU 6, CPU 7, in system 300. Accordingly, the plurality of processors CPU 0-CPU 7 may be coupled to the sockets 306. For example, according to various embodiments one or more of the processors CPU 0-CPU 7 of sockets 306 may be plug in/unplug processors of a type known in the art. Implementing plug in/unplug processors in system 300 may be advantageous, e.g., allowing for easy processor upgrades/swapping, allowing for accessibility during processor maintenance, maintaining a low cost system, etc. According to further embodiments, one or more of the processors CPU 0-CPU 7 of sockets 306 may be affixed to one or more of the sockets 306 during fabrication of system 300.

System 300 may further include memory modules 314, which may be coupled directly to one or more of the socket servers 302, 304. It should be noted that although system 300 illustrates only one memory module 314 being coupled directly to one socket 306 in each of the socket servers 302, 304, a memory module 314 may be directly coupled to, e.g., two, three, all, etc., of the sockets 306 of each of socket servers 302, 304.

The memory modules 314, may be coupled directly to the socket servers 302, 304 by a coupling, e.g., direct plug-in/insert coupling, in-line coupling, a coupling of a type known in the art, etc. The types of coupling in each of the one or more socket servers 302, 304, described herein may vary depending on the embodiment.

Each of the sockets 306 may be electrically interconnected with other sockets 306 in the same socket servers 302, 304, as noted by the dashed lines e.g. interconnects 1-1, interconnects 0-0, interconnects 2-2, etc., of system 300. It should be noted that according to various embodiments, one or more of the interconnects 1-1, 0-0, 2-2 may be quick path interconnects.

The socket servers 302, 304 may be electrically and/or functionally combined for purposes of increasing the bandwidth that may utilized, e.g., during decoding tasks, during server access events, during processing events of a type known in the art, etc. In order to establish the multi-socket server interconnection between each of the socket servers 302, 304, system 300 may further include a plurality of adapters 308. As depicted in system 300, one or more adapters 308 may in part establish the electrical and/or functional pairing between socket(s) 306 of socket server 302 and socket(s) 306 of socket server 304. For example, FIG. 3 depicts CPU 6 of socket server 302 being connected to CPU 6 of socket server 304 via two adapters 308.

In preferred approaches, the electrical and/or functional pairing between the sockets 306 of the first socket server 302 and the sockets 306 the second socket server 304 may be directly and/or indirectly electrically connected with one or more adapters 308 via physical PCI express plugs pairings 324, 326, 328, 330. For example, the first socket server 302 may include plug receptacles 0-31, and the second socket server 304 may include plug receptacles 32-63. The spacing between plug receptacles associated with the physical PCI express plug pairings 324, 326, 328, 330 may be selected to reserve a sufficient number of plug receptacles that could support adapters 308 with PCI bridges. According an exemplary embodiment, physical PCI express plugs pairings 324, 326, 328, 330 may be located in plug receptacles, 9, 36, 1 and 39 (respectively) in one or more of the socket servers 302, 304.

Utilizing a plurality of adapters 308 as described herein may furthermore advantageously reduce communication backlog at Quick Path Interconnects (QPIs) between the socket servers 302, 304.

Furthermore, each of the adapters 308 may be electrically connected via adapter interconnects 312. For example, the sockets 306 which include CPU 6 in each of the socket servers 302, 304 are shown in FIG. 3 directly electrically connected with adapters 308 via express plug pairings 326, and the two adapters are electrically connected to each other via an adapter interconnect 312. According to preferred embodiments the adapter interconnects 312 may couple the adapters 308 associated with the different ones of the socket servers 302, 304 together with cables. For example, the adapter interconnects 312 may be, e.g., a PCIe ×16 lane extender cable, a flat strip plug in/unplug cable, a cable of a type known in the art, a printed circuit board, etc. In further approaches, adapter interconnects 312 may include a direct connection between the physical boards of the adapters 308.

According to various embodiments, the adapter interconnects 312 may include a ×16 lane outgoing data cable, a ×16 lane incoming data cable, and/or an additional ×1 lane management cable. Furthermore, the adapter interconnects 312 may preferably have a length in the range of 12-30 inches, but could be longer or shorter depending on the embodiment. Maintaining a relatively short adapter interconnect 312 length may advantageously ensure an acceptable margin and/or signal integrity between each of the socket servers 302, 304 which may be preferably positioned back to back and fixed in the same rack. Having socket servers positioned back to back and fixed in a single rack may be further advantageous because extra adapter interconnect slack (adding to the overall cable length and decreasing margin and/or signal integrity provided by the cable) is not necessary. Conventional slidable rack servers have on occasion included longer adapter interconnects for servicing purposes, which may result in degraded signal integrity.

Some sockets 306 may be indirectly electrically connected with one or more adapters 308, e.g., via express plugs. For example, in system 300, the sockets 306 which include CPU 4, CPU 2, CPU 7 and CPU 1 are not directly electrically connected with adapters 308 via express plugs; rather such sockets 306 are indirectly electrically connected with the respective adapters 308 via express plugs, established by one or more interconnects 0-0, 1-1, 2-2.

Each of the socket servers 302, 304 may furthermore have at least one serial computer expansion bus. According to various embodiments, the serial computer expansion buses may be Peripheral Component Interconnect Express (PCIe) slots which may couple with one or more adapter PCIe slot connectors. Moreover, the one or more serial computer expansion buses may be preferably coupled directly to each of the sockets 306 thereof. In further embodiments, the one or more serial computer expansion buses may be alternatively coupled directly to one or more of the processors CPU 0-CPU 7, thereof.

In a preferred approach, the adapters 308 may be coupled directly to the serial computer expansion buses. Alternatively, the adapters 308 may be indirectly coupled, e.g., via leads, to the serial computer expansion buses. Coupling types of the adapters 308 to the serial computer expansion buses of embodiments described herein may vary depending on the preferred embodiment.

Figure 4:
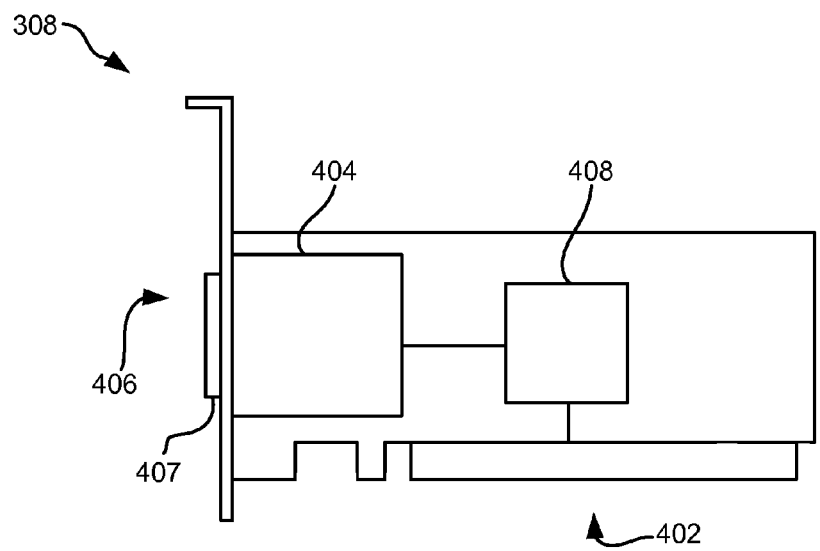
FIG. 4 is a side view of an adapter of FIG. 3, in accordance with one embodiment.

Referring momentarily to FIG. 4, an illustrative adapter 308 is illustrated in greater detail.

FIG. 4 depicts an adapter 308 which may serve as a serial computer expansion bus adapter in accordance with one embodiment. As an option, the present adapter 308 may be implemented in conjunction with features from any other embodiment listed herein, such as those described with reference to the other FIGS. Of course, however, such adapter 308 and others presented herein may be used in various applications and/or in permutations which may or may not be specifically described in the illustrative embodiments listed herein. Further, the adapter 308 presented herein may be used in any desired environment.

Adapter 308 includes a first end 406, and a second end 402. The first end 406 may include one or more adapter interconnect receptacles 407. According to various embodiments, in order to establish a coupling between two or more adapters 308, the adapter interconnects 312 of system 300 (see FIG. 3) may be coupled, e.g., be plugged in, be magnetically guided into electrical contact, be soldered, etc., with the receptacles 407 of two different adapters 308. In other embodiments, in order to establish a coupling between two or more adapters 308, the adapter interconnect receptacles 407 of an adapter 308 may be electrically coupled to the second adapter interconnect receptacle 407 of a different adapter 308. The adapter 308 may additionally include a housing 404 for enclosing the interconnect receptacles 407.

Adapter 308 may be preferably coupled directly to the serial computer expansion buses, e.g., where the second end 402 is inserted into the serial computer expansion bus, where the second end 402 is permanently electrically coupled to the serial computer expansion bus, where the second end 402 is directly coupled to the serial computer expansion bus, etc. It should be noted that the second end 402 may include leads for establishing the electrical coupling with the serial computer expansion bus described herein.

In other embodiments, the adapters 308 may be indirectly coupled, e.g., by a cable, to the serial computer expansion buses. Coupling types of the adapters 308 to the serial computer expansion buses of embodiments described herein may vary depending on the preferred embodiment.

Adapter 308 may include circuitry 408 configured to provide the functionality described herein. For example, the circuitry 408 may include a switch, a controller, etc.

Adapter 308 also may include an alignment feature which may help guide the adapter interconnects 312 into the adapter interconnect receptacles 407, e.g., to ensure an easy and/or guided coupling process. Furthermore, a fan may be coupled to the adapter 308. One or more fans may help maintain a safe operational temperature of adapter 308 and or system 300. Adapted presently available for sale may be used in various embodiments. For example, one suitable adapter is the PCIe ×16 Gen 3 Switch-based Cable Adapter (part number OSS-PCIe-HIB38-×16), sold by One Stop Systems having a place of business at 2235 Enterprise Street #110, Escondido, Calif. 92029.

Figure 5:
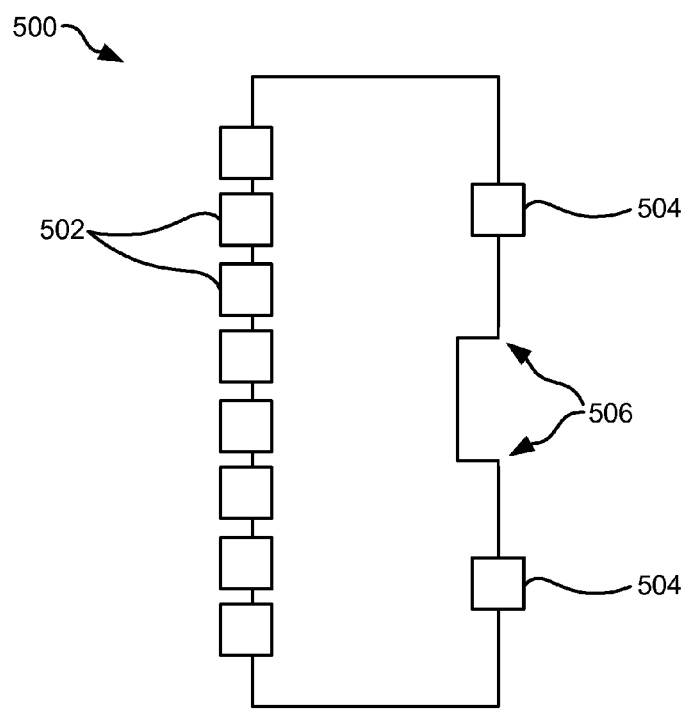
FIG. 5 is a side view of an interconnection planar, in accordance with one embodiment.

Further exemplary PCIe connectors will now be detailed by FIG. 5.

FIG. 5 depicts an interconnection planar 500 in accordance with one embodiment. As an option, the present interconnection planar 500 may be implemented in conjunction with features from any other embodiment listed herein, such as those described with reference to the other FIGS. Of course, however, such interconnection planar 500 and others presented herein may be used in various applications and/or in permutations which may or may not be specifically described in the illustrative embodiments listed herein. Further, the interconnection planar 500 presented herein may be used in any desired environment.

Interconnection planar 500 may functionally serve as an adapter 308 according to various embodiments. The interconnection planar 500 may include one or more ×16 lane connectors 504 for coupling to PCIe slots. Moreover the interconnection planar 500 may include one or more connectors 502 for coupling to one or more different interconnection planars 500 of other socket servers 302, 304.

Interconnection planar 500 further includes two bays 506 for optional hard disk drive (HDD) or other memory type expansion. Each of the one or more bays 506 of the interconnection planar 500 may include at least one ×16 lane connector 504.

It should be noted that the interconnection planar 500 may establish a direct coupling between socket servers which do not include cabling. For example, interconnection planar 500 may establish a direct coupling between e.g., two or more two socket servers, four socket servers, eight socket servers, etc. without switching and/or re-drive.

The interconnection planar 500 may further include switching elements.

Referring again to FIG. 3, the adapters 308 may additionally be configured to enable communication between the processors, e.g., CPU 0-CPU 7, of different ones of the socket servers 302, 304, coupled together thereby. Enabling communication between the processors of different ones of the socket servers 302, 304 may be beneficial because the processors of the coupled socket servers 302, 304 are, by a functional pairing, able to utilize a greater amount of QPI bandwidth, e.g., a greater amount relative to what a single processor would utilize in a single socket server, that is available in a given system, e.g., system 300.

Additionally the processors of the coupled socket servers may enable use of a substantially greater decode space and physical memory.

It should be noted that a greater decode space and physical memory may not otherwise be functionally established by fabricating a socket server with additional servers and/or adapters. For example, a socket server having sixteen sockets may be limited to the physical memory and/or decoding bandwidth of an eight socket, socket server e.g. socket server 302, while alternatively functionally pairing two, eight socket, socket servers e.g. socket servers 302, 304 may advantageously double the system available physical memory and/or decoding bandwidth. With continued reference to the example above, a sixteen socket, socket server may include a node controller of a type known in the art for socket 306 to socket 306 communication management, as previously noted.

Logical configurations and illustrative examples of system 300 that may enable communication between the processors of different ones of the socket servers coupled together thereby will now be described in detail below.

System 300 may include logic configured to assign a first address range to each of the socket servers 302, 304 and a second address range to each of the adapters 308. The second address range may be preferably different than the first address range. Additionally, according to various embodiments, the socket servers may have identical physical address ranges, e.g., the identical physical address ranges being the first address range. Similarly, the second address range may be preferably the same for all of the adapters 308.

For example, each of the socket servers 302, 304 may be assigned an identical 0-12 terabyte address range while each of the adapters 308 may be assigned an identical 16-28 terabyte address range. Assigning a first address range to each of the socket servers 302, 304 may allow for the first socket server 302 to functionally pair with the second socket server 304. Similarly assigning a second address range to each of the adapters 308 may establish decode address windows, e.g., for decoding tasks, which may preferably be performed by socket server subgroupings.

It should be noted that the in between 12-16 terabyte address range may be assigned to Memory Mapped Input/Output (MMIO).

System 300 may also and/or alternatively include logic configured to group the sockets 306 into subgroups 316, 318, 320, 322. A unique one of the adapters 308 may be associated with each subgroup 316, 318, 320, 322, where each socket server 302, 304 may be configured to direct an access in the second address range by one of the processors in one of the subgroups 316, 318, 320, 322 to the adapter 308 associated with the subgroup 316, 318, 320, 322. For example, the logic, e.g., firmware, may assign an address decode range from 16-28 terabytes on the adapter 308 in plug 324 of subgroup 316. In response to this address decode range being established, an access from the CPU 0 of the first socket server 302 in the 16-28 terabyte range may also generate e.g. by being transmitted across plug 324 in the first socket server 302, down coupling adapters 312, and across plug 324 in the second socket server 304, an access in the same range the second socket server 304.

Subgroups 316, 318, 320, 322 may advantageously prioritize an increased decoding area. Furthermore, the bandwidth in system 300 may be substantially increased due to processing being performed on the more than one socket servers 302, 304, e.g., 16 total sockets in system 300, a substantially greater decode space and physical memory, as described above.

It should be noted that the number of socket servers that may be functionally paired with a first socket server, e.g., socket server 302 may not be limited to one additional socket server, e.g., second socket server 304. The number of number of socket servers that may be functionally paired with a first socket server 302 may be, e.g., three socket servers (see FIG. 6 below), four socket servers, any number of socket servers, etc., depending on system spatial constraints and/or user physical memory demands.

Another advantage of system 300 may include memory channel storage dump backups. For example, the system may perform a memory dump in CPU-4 of the first socket server 302. The higher bandwidth of system 300 may enable the system to make a copy of the memory dump in CPU-4 and store the memory dump on the second socket server 304 as well.

So that communication and data transfer may occur between one or more socket servers 302, 304, a non-transparent bridge mode (NTB mode) translation may be established between two or more servers of each of the socket servers 302, 304 of system 300. The NTB mode may enable an address translation to be transmitted from one socket server to another. A hypervisor may furthermore manage memory being transmitted from one server to another.

Processors indirectly coupled to one or more adapters 308 of the first socket server 302 may also have shared access events, enabled by being transmitted across one or more interconnects to a processor that has both a direct coupling to one or more adapters and is furthermore in the same subgroup. For example, because processor CPU 2 of socket server 302 is indirectly coupled to adapter 308 of subgroup 320, interconnect 1-1 may be establish an electrical path by which CPU 2 of socket server 302 is able to communicate and/or share access events with a processor of socket server 304 via relaying through socket 306 which includes CPU 6 of subgroup 320, which is directly coupled to adapter 308 of subgroup 320.

Figure 6:
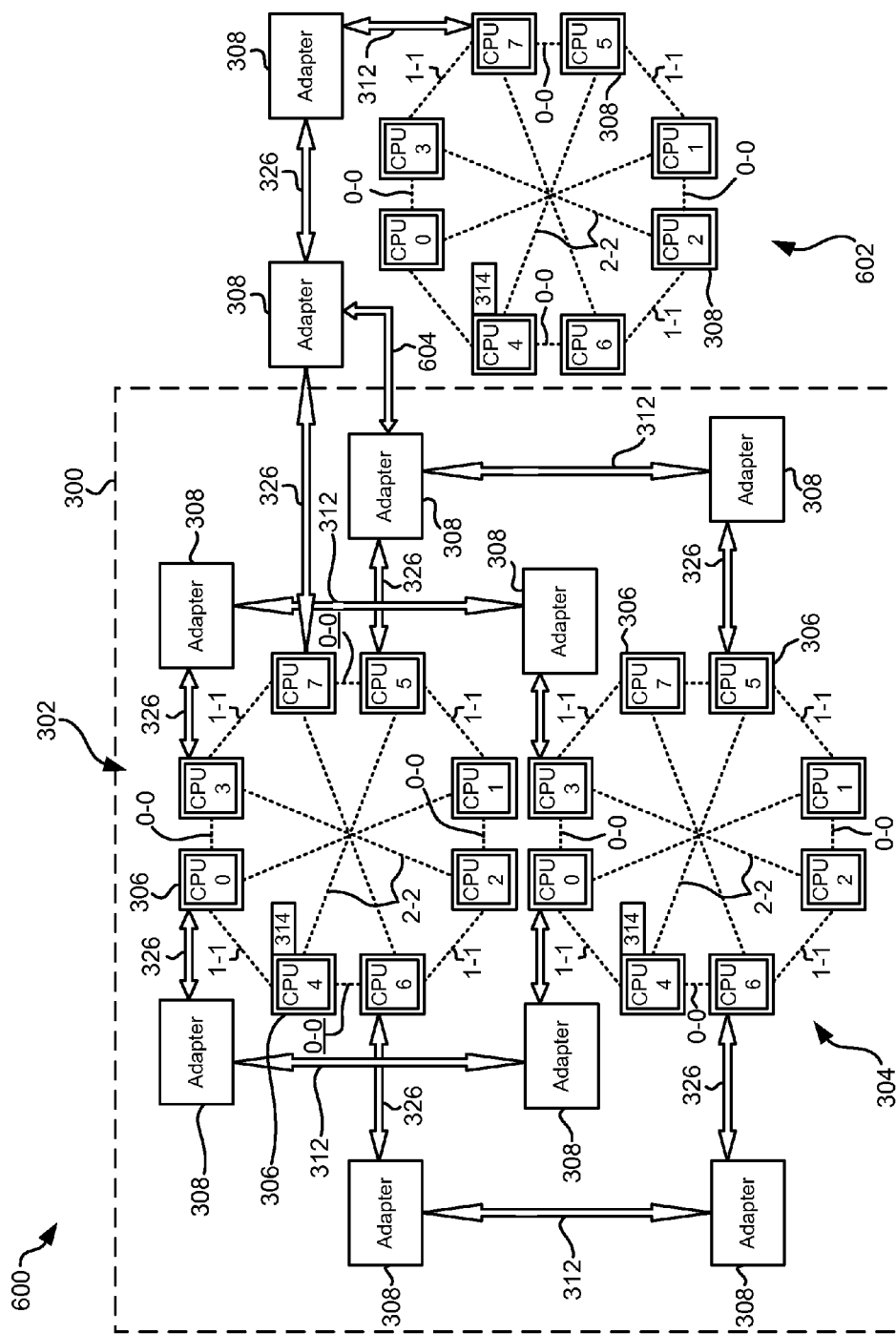
FIG. 6 is a representational diagram of a multi-socket server system architecture, in accordance with one embodiment.

FIG. 6 depicts a system 600 in accordance with one embodiment. As an option, the present system 600 may be implemented in conjunction with features from any other embodiment listed herein, such as those described with reference to the other FIGS. Of course, however, such system 600 and others presented herein may be used in various applications and/or in permutations which may or may not be specifically described in the illustrative embodiments listed herein. Further, the system 600 presented herein may be used in any desired environment.

System 600 includes the first and second socket servers 302, 304 of system 300, and furthermore includes a third socket server 602.

Systems described herein e.g. system 300, system 600, etc., may further include logic, e.g., firmware, configured to cause multiple processors CPU1-CPU7 to communicate with a single local adapter 308. Accordingly, there may be fewer adapters 308 directly coupled to each socket server 302, 304, 602 than processors CPU1-CPU7, and as such, each adapter may handle communications from multiple processors CPU1-CPU7.

It may be noted that as illustrated in system 300 and system 600, the number of adapters 308 directly coupled to each socket server 302, 304, 602 may be less than the number of sockets 306 of the respective socket server 302, 304, 602. For example, socket server 302 includes eight sockets 306 and four adapters 308 directly coupled to socket server 302.

Alternatively, in other embodiments, the number of adapters 308 directly coupled to each socket server 302, 304, 602 may be greater than the number of sockets 306 of the respective socket server 302, 304, 602. In embodiments where the number of adapters directly coupled to each socket server 302, 304, 602 is greater than the number of sockets 306 of the respective socket server 302, 304, 602, the socket servers may include logic to enable adapters 308 of each socket server 302, 304, 602 to communicate with any number of adapters of one or more other socket servers. For example in system 600, an adapter 308 is electrically coupled to and in communication with two different adapters 308 via express plug 326 and a second express plug 604. The number of adapters 308 directly coupled to each socket server 302, 304, 602 may vary depending on the preferred embodiment, to the extent that system performance is not decreased.

In one illustrative example, system 300 may include: (2) ×3950 X6 socket servers with direct PCI Express scaling, (64) ×8 Gigabyte (Gb) Gen3 lanes between servers, Interconnect ×16s may be between CPU 0, 3, 5, and 6, e.g., for purposes of to balance bandwidth topology, hardware of a type known in the art such as the aforementioned OSS-PCIe-HIB38-×16 adapter sold by One Stop Systems, (4) ×16 cables between the servers, and/or (4)I/O books for CPUs 3 and 6, with 8 scaling adapters.

Further embodiments of socket servers and system interconnects will now be detailed below.

Figure 7:
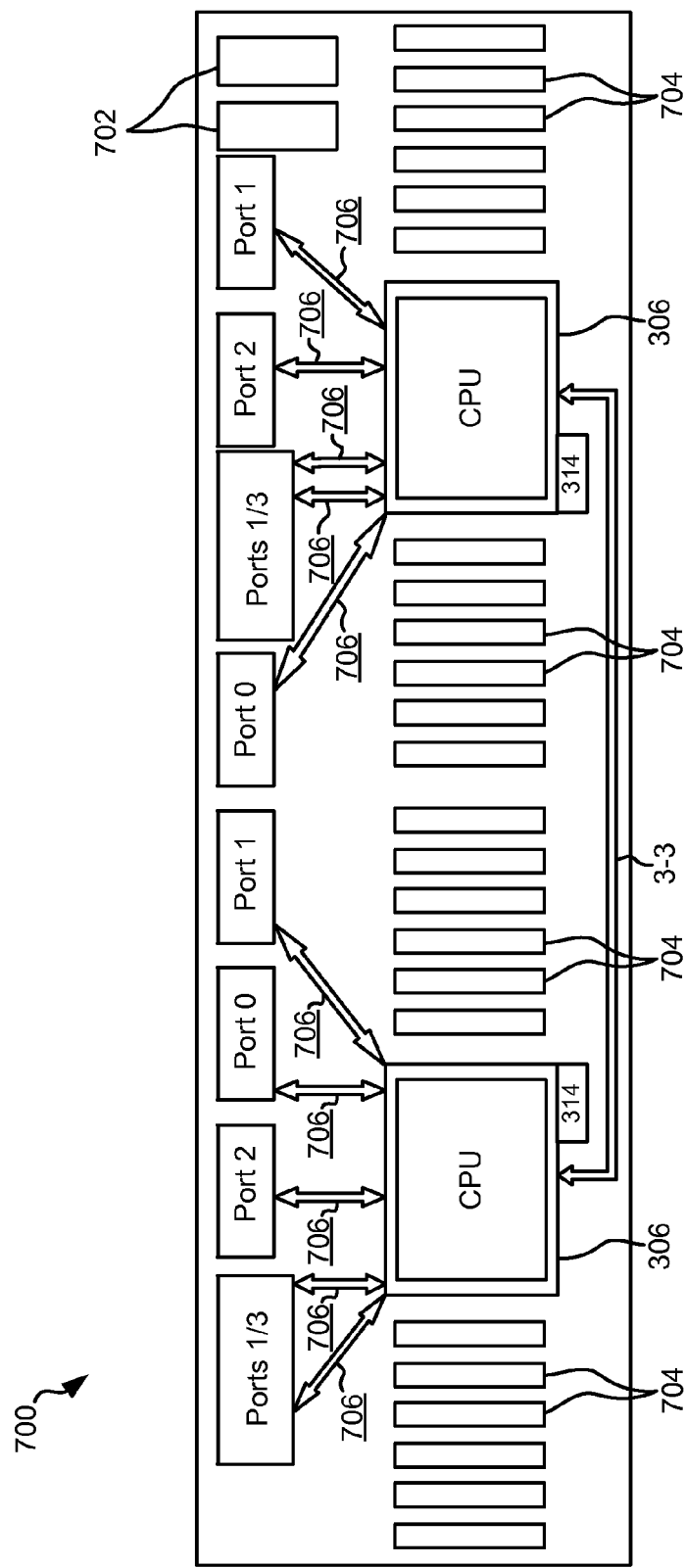
FIG. 7 is a representational diagram of a multi-socket server system architecture, in accordance with one embodiment.

FIG. 7 depicts a system 700 in accordance with one embodiment. As an option, the present system 700 may be implemented in conjunction with features from any other embodiment listed herein, such as those described with reference to the other FIGS. Of course, however, such system 700 and others presented herein may be used in various applications and/or in permutations which may or may not be specifically described in the illustrative embodiments listed herein. Further, the system 700 presented herein may be used in any desired environment.

System 700 is a two socket 306 compute book. Accordingly, system 700 may be described as having a "1U" configuration, which may further be noted as having a rack unit height of 1, when implemented in a mid-chassis interconnect. The two sockets 306 of system 700 may be connected via an interconnect 3-3. Each of the sockets 306 may furthermore include a CPU. Interconnect 3-3 furthermore establishes an electrical coupling between the CPUs of sockets 306. Each of the sockets 306 may additionally include at least one memory module 314. According to various embodiments, each of the one or more of the sockets 306 may include 12 double data rate type fours (DDR4) 704, e.g., 24 total shown in system 700, with two DIMMS per channel. According to other embodiments, the memory module makeup included in systems described herein may vary.

System 700 may additionally include socket ports 0, 1, 2 and 1/3, which may be electrically coupled to the sockets 306 via port interconnects 706. According to preferred embodiments, port interconnects 706 may be ×16 cables. System 700 may include lanes of PCI express, where the PCI express lanes may vary depending on the preferred embodiment. Alternatively, port interconnects 706 may be a direct connection between the sockets 306 and socket ports 0, 1, 2 and/or 1/3. Power terminals 702 may deliver power to system 700, e.g., via a local power supply, via coupling to a power supply, via a power supply hookup of a type known in the art, etc.

Figure 8:
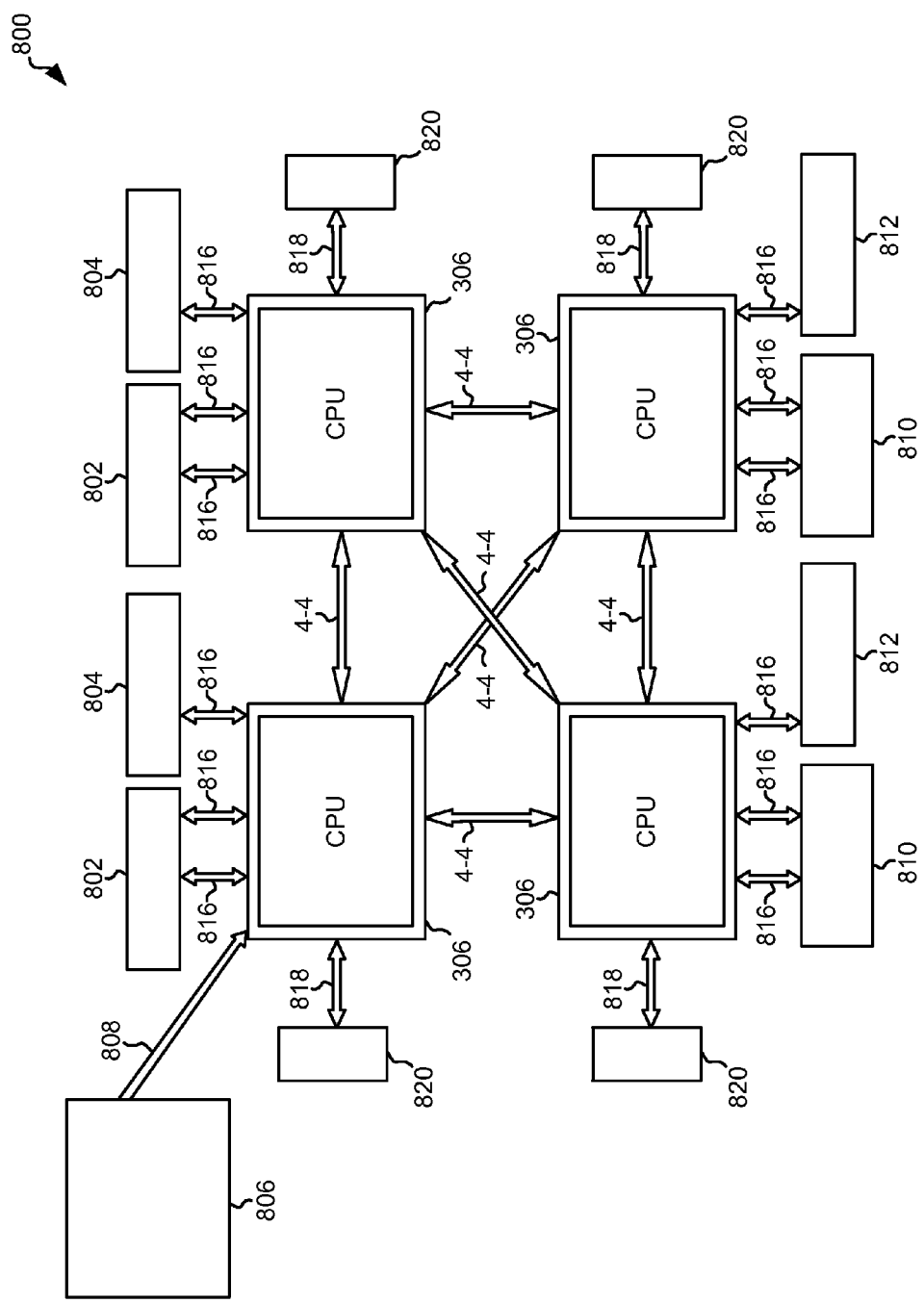
FIG. 8 is a representational diagram of a multi-socket server system architecture, in accordance with one embodiment.

FIG. 8 depicts a system 800 in accordance with one embodiment. As an option, the present system 800 may be implemented in conjunction with features from any other embodiment listed herein, such as those described with reference to the other FIGS. Of course, however, such system 800 and others presented herein may be used in various applications and/or in permutations which may or may not be specifically described in the illustrative embodiments listed herein. Further, the system 800 presented herein may be used in any desired environment.

It should be noted that FIGS. 7, 8, 9A, 9B, 10, 11, 12, 13 and 14 illustrate variations of similar system environments which systems such as systems 300 and 600 may be implemented in conjunction with. Accordingly, various components of FIGS. 7, 8, 9A, 9B, 10, 11, 12, 13 and 14 may share common numberings.

System 800 is an illustrative four socket 306 front storage book. Each of the four sockets 306 of system 800 may be connected with each of the other sockets 306 via interconnects 4-4. Interconnects 4-4 furthermore establish an electrical coupling between the CPUs of sockets 306. According to various embodiments, each of the one or more sockets 306 may be electrically coupled to 12 DIMM slots 820, via one or more interconnects 818.

System 800 may further include ×32 lane Base Input-Output (hereafter referred to as IO") books 802, and ×16 lane front storage units 804. Each of the Base IO books 802 and front storage units 804 may be electrically coupled to one or more sockets 306, as illustrated in FIG. 8 via interconnects 816. According to preferred embodiments, interconnects 816 may be ×16 cables. Interconnects 816 may furthermore electrically couple one or more sockets 306 to one or more rear storage units 812 and/or additional 2U and/or 4U socket servers 810. In further embodiments, sockets 306 may not be electrically coupled to any additional 2U and/or 4U socket servers 810. An IO controller 806 may be additionally electrically coupled with one or more sockets and/or CPUs of system 800 via a controller interconnect 808.

Figure 9A:
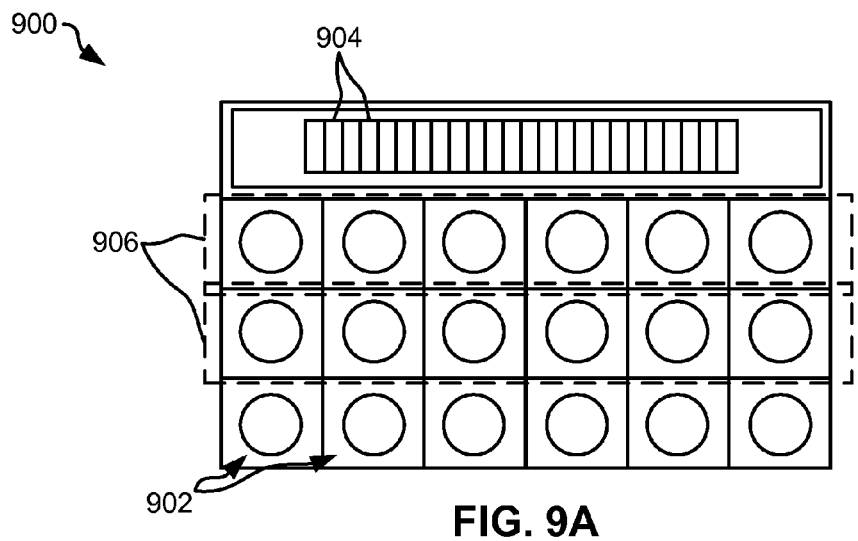
FIG. 9A is a frontal view of a modular chassis, in accordance with one embodiment.
Figure 9B:
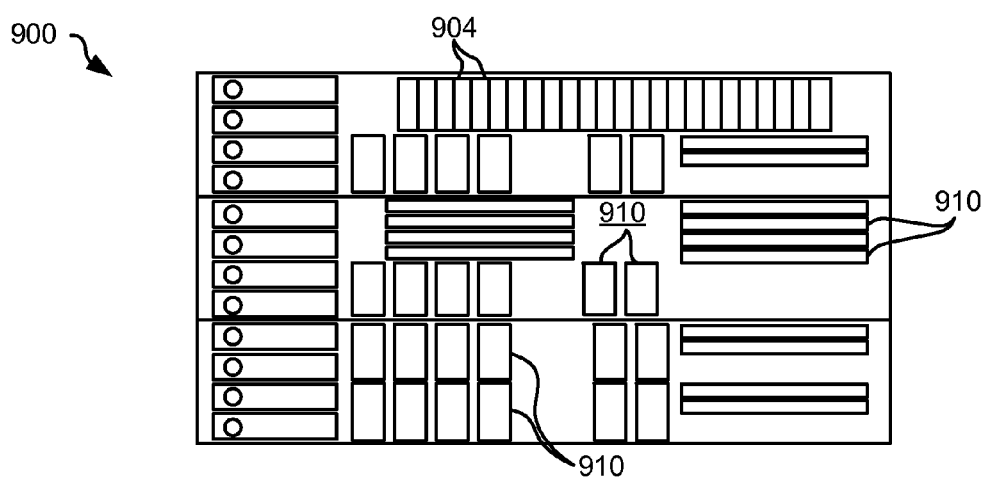
FIG. 9B is a rear view of a modular chassis, in accordance with one embodiment.

FIG. 9A-9B depict a modular chassis 900 in accordance with one embodiment. As an option, the present modular chassis 900 may be implemented in conjunction with features from any other embodiment listed herein, such as those described with reference to the other FIGS. Of course, however, such modular chassis 900 and others presented herein may be used in various applications and/or in permutations which may or may not be specifically described in the illustrative embodiments listed herein. Further, the modular chassis 900 presented herein may be used in any desired environment.

FIG. 9A illustrates a frontal view of the modular chassis 900 which systems described herein may be installed within, e.g., the compute book of system 700. Modular chassis 900 may include fans 902 and drive bays 904. Each six fan array 906 may be configured to cool and/or host a four socket, socket server. It should be noted that although each of the six fan arrays 906 are 1×6 arrays, fan arrays 906 of further embodiments may vary in configuration. For example, according to further embodiments, modular chassis may be configured to cool and/or host one or more 8U socket server, e.g., of system 300 and/or of system 600.

FIG. 9B illustrates a rear view of the modular chassis 900. The back side of the modular chassis 900 may include drive bays 904 similar to the frontal side of the modular chassis 900. The back side of the modular chassis 900 may additionally include covered socket receptacles 910 of a type known in the art for further electrical coupling.

Figure 10:
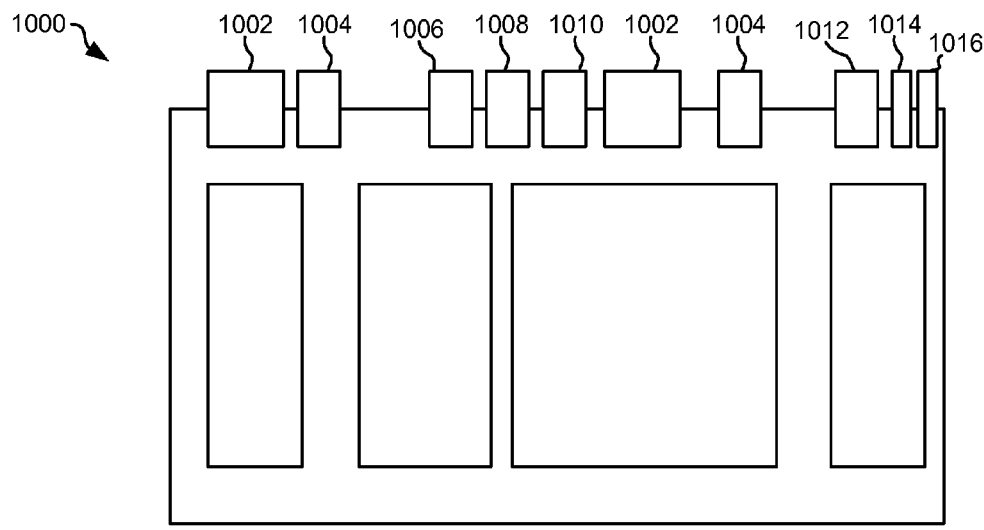
FIG. 10 is a top view of a processor board building block, in accordance with one embodiment.

FIG. 10 depicts a processor board building block 1000 in accordance with one embodiment. As an option, the present processor board building block 1000 may be implemented in conjunction with features from any other embodiment listed herein, such as those described with reference to the other FIGS. Of course, however, such processor board building block 1000 and others presented herein may be used in various applications and/or in permutations which may or may not be specifically described in the illustrative embodiments listed herein. Further, the processor board building block 1000 presented herein may be used in any desired environment.

The processor board building block 1000 may be implemented among systems described herein. Furthermore, the processor board building block 1000 according to one illustrative example may include: (2) socket processors, (24) DDR4 DIMM sockets, (2) ×32 PCIe 10 slots 1002, (2) ×16 PCIe slots 1004, e.g., for storage and/or scaling, interconnects 1006, 1008, 1010, 1012, one or more sidebands (not shown), a ground power port 1014, and a 12 Volt power port 1016.

Figure 11:
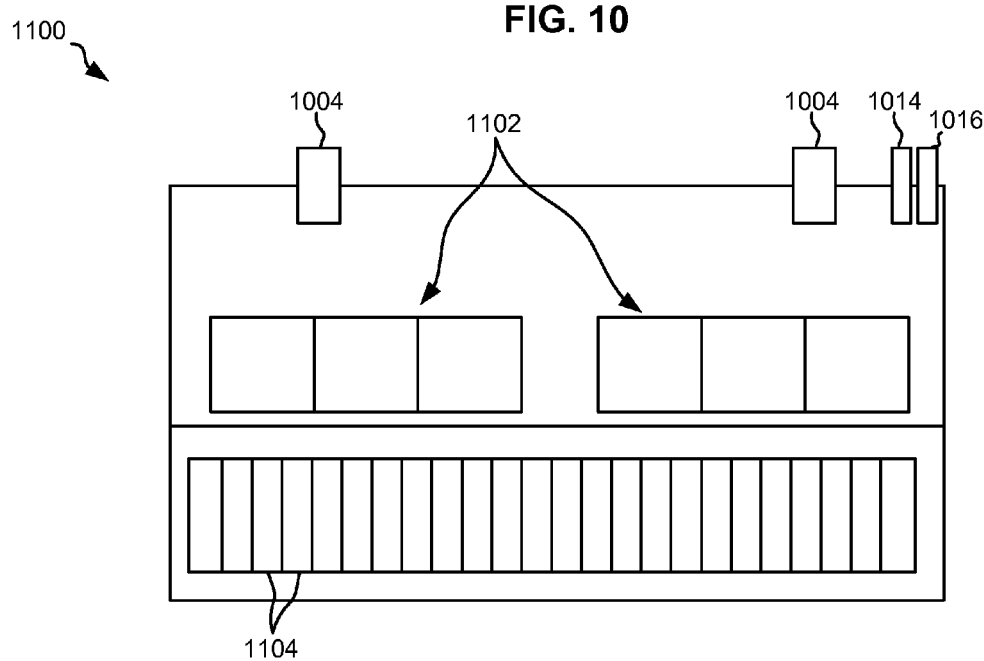
FIG. 11 is a top view of a front storage module, in accordance with one embodiment.

FIG. 11 depicts a front storage module 1100 in accordance with one embodiment. As an option, the present front storage module 1100 may be implemented in conjunction with features from any other embodiment listed herein, such as those described with reference to the other FIGS. Of course, however, such front storage module 1100 and others presented herein may be used in various applications and/or in permutations which may or may not be specifically described in the illustrative embodiments listed herein. Further, the front storage module 1100 presented herein may be used in any desired environment.

The front storage module 1100 may be implemented among systems described herein. Furthermore, the front storage module 1100 may include ×16 PCIe slots 1004. Additionally, the front storage module 1100 may include a ground power port 1014, and a 12 Volt power port 1016. One or more fan drives 1102 may additionally be affixed to the front storage module 1100 for cooling and/or cleaning purposes, e.g. of a mid-chassis interconnect environment. About 16-24 HDDs 1104 may be affixed to the front storage module 1100. The fan drives 1102 may include 4-70 mm fans of a type known in the art, with hot swappable capabilities. It should be noted that the fan drives 1102, HDDs 1104, and/or the fixtures to which the fan drives 1102 and/or the HDDs 1104 are affixed may be removable for servicing purposes.

Figure 12:
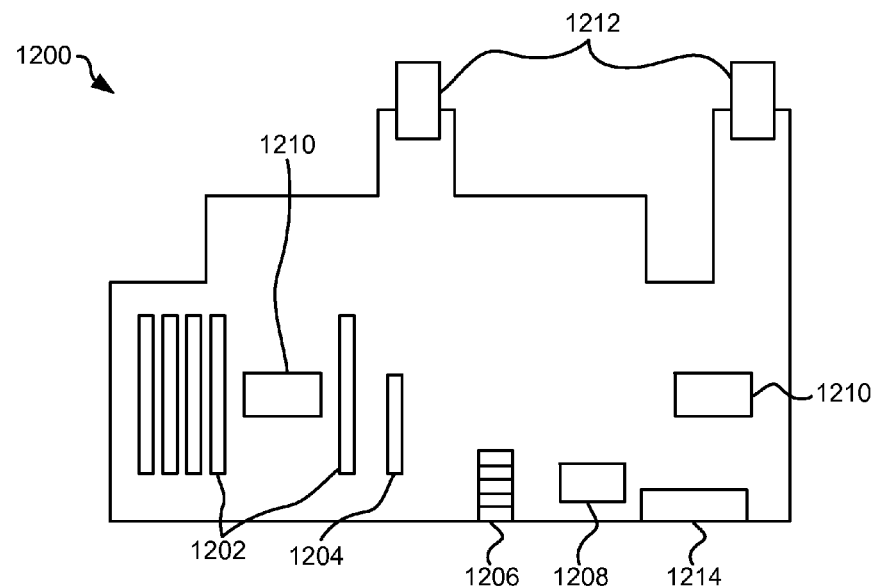
FIG. 12 is a side view of a rear base I/O board, in accordance with one embodiment.

FIG. 12 depicts a rear base I/O board 1200 in accordance with one embodiment. As an option, the present rear base I/O board 1200 may be implemented in conjunction with features from any other embodiment listed herein, such as those described with reference to the other FIGS. Of course, however, such rear base I/O board 1200 and others presented herein may be used in various applications and/or in permutations which may or may not be specifically described in the illustrative embodiments listed herein. Further, the rear base I/O board 1200 presented herein may be used in any desired environment.

One or more rear base I/O board 1200 may preferably be included in socket server systems, e.g., such as system 300 and/or system 600, for connectivity purposes. The rear base I/O board 1200 according to one illustrative example may include: (5) low profile ("LP") PCIe slots 1202, ×64 lanes of PCIe from one or more processor boards, (2) system power connectors (not shown), (1) system sideband connector (not shown), (1) ML2 slot 1204, (2) sideband to riser connectors 1210, (4) USB slots 1206, two PCIe connectors 1212, a management Ethernet slot 1214, a 15-pin VGA cable slot 1208, a 9-pin serial cable slot, and a quad 10G Ethernet down slot. The components of the rear base I/O board 1200 may vary according to further embodiments.

Figure 13:
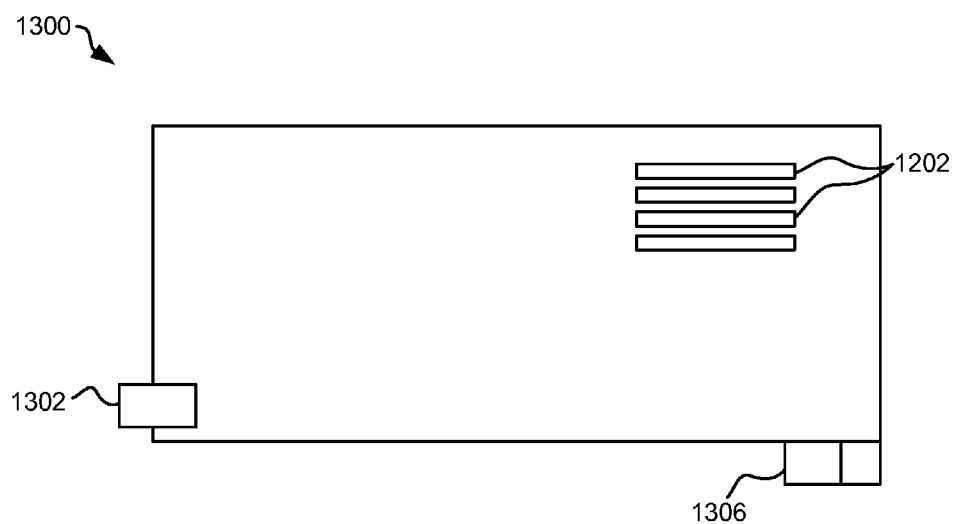
FIG. 13 is a side view of a PCIe riser, in accordance with one embodiment.

FIG. 13 depicts a PCIe riser 1300 in accordance with one embodiment. As an option, the present PCIe riser 1300 may be implemented in conjunction with features from any other embodiment listed herein, such as those described with reference to the other FIGS. Of course, however, such PCIe riser 1300 and others presented herein may be used in various applications and/or in permutations which may or may not be specifically described in the illustrative embodiments listed herein. Further, the PCIe riser 1300 presented herein may be used in any desired environment.

PCIe risers 1300 may elevate and/or multiply electrical connections in a socket server system, e.g., systems 300, 600. For example, PCIe riser 1300 may be capable of elevating electrical connections from a height of 1U to a height of 4U. In further embodiments, PCIe risers may be capable of elevating electrical connections to a height of, e.g., 8U or less, 2U or less, etc. The PCIe riser 1300 may include standard and/or low profile ("LP") PCIe slots 1202. The PCIe riser 1300 may also include a ×16 PCIe connector 1302, and a PCI express slot 1306.

Figure 14:
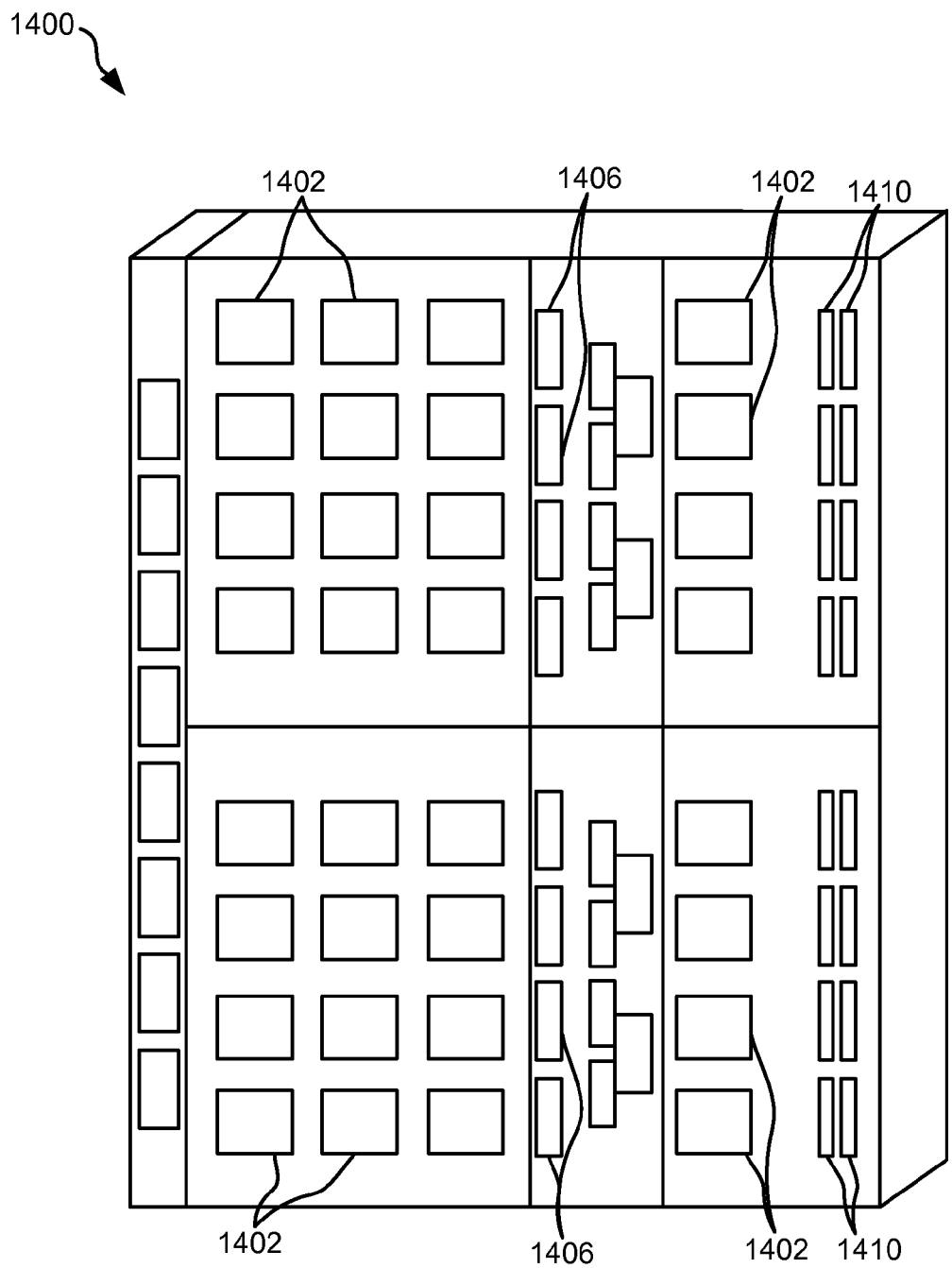
FIG. 14 is a side view of a mid-chassis interconnect, in accordance with one embodiment.

FIG. 14 depicts a mid-chassis interconnect 1400 in accordance with one embodiment. As an option, the present mid-chassis interconnect 1400 may be implemented in conjunction with features from any other embodiment listed herein, such as those described with reference to the other FIGS. Of course, however, such mid-chassis interconnect 1400 and others presented herein may be used in various applications and/or in permutations which may or may not be specifically described in the illustrative embodiments listed herein. Further, the mid-chassis interconnect 1400 presented herein may be used in any desired environment.

One or more mid-chassis interconnects 1400 may house components of systems described herein and/or systems described herein. Mid-chassis interconnect 1400 may include ×16 socket interconnect ports 1402, and one or more arrays of express plugs 1406 of a type known in the art, e.g., PCI express plugs. A plurality of power ports 1410 may accept power for delivery to components the mid-chassis interconnect 1400. An array of high-band signal ports may also be included in the mid-chassis interconnect 1400.

Housing components of systems described herein and/or systems described herein on the mid-chassis interconnect 1400 may be more beneficial than placing the components on a large conventional single mid-plane because airflow may be less restricted and/or production costs may be reduced.

Figure 15:
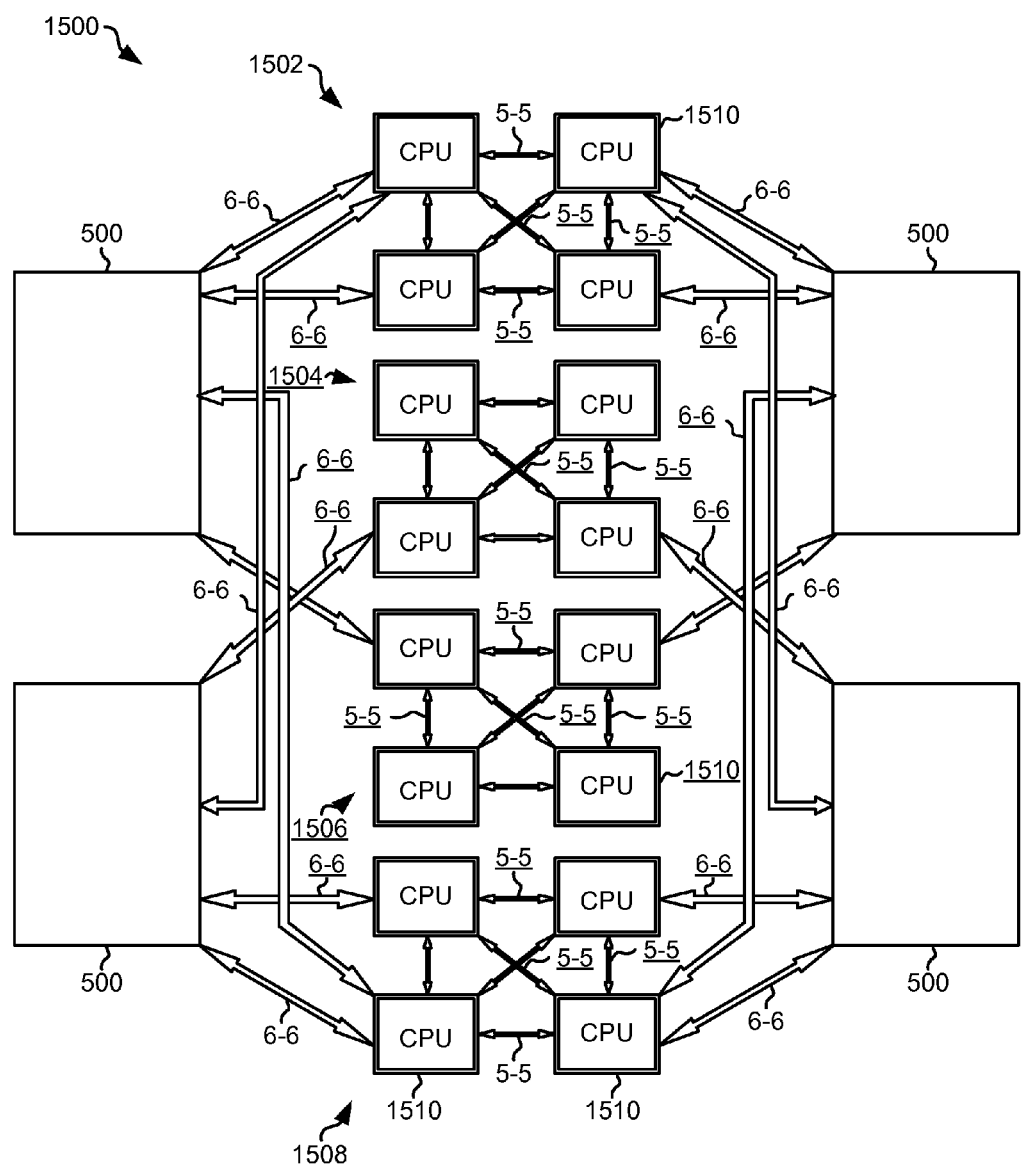
FIG. 15 is a representational diagram of a multi-socket server system architecture, in accordance with one embodiment.

FIG. 15 depicts a system 1500 in accordance with one embodiment. As an option, the present system 1500 may be implemented in conjunction with features from any other embodiment listed herein, such as those described with reference to the other FIGS. Of course, however, such system 1500 and others presented herein may be used in various applications and/or in permutations which may or may not be specifically described in the illustrative embodiments listed herein. Further, the system 1500 presented herein may be used in any desired environment.

System 1500 is a socket server system architecture, in accordance with one embodiment. System 300 includes a first non-cabled socket server 1502, a second non-cabled socket server 1504, a third non-cabled socket server 1506 and a fourth non-cabled socket server 1508. Each of the sockets 1510 of the non-cabled socket servers 1502, 1504, 1506, 1508 may include a CPUs, and may furthermore be coupled with one or more other sockets 1510 of the same socket server 1502, 1504, 1506, 1508 via interconnects 5-5. Interconnects 5-5 may preferably be ×16 socket interconnect ports 1402 (see FIG. 14). The CPUs may preferably include ×16 lanes. Moreover a processor of system 1500, e.g., where each U of the 8U includes two processors, may have 48 lanes.

Sockets 1510 of the non-cabled socket servers 1502, 1504, 1506, 1508 may be electrically coupled to sockets 1510 of different non-cabled socket servers 1502, 1504, 1506, 1508 via interconnects 6-6, which may be selectively routed through one or more interconnection planars 500, thereby establishing an 8U, 16 socket configuration. Routing the coupling of different non-cabled socket servers 1502, 1504, 1506, 1508 via one or more switch cards 500 may beneficially increase the organization of system 1500 due to the lack of bunched cables and/or lack of complicated hookups within a chassis that houses system 1500.

It should be noted that although the socket servers 1502, 1504, 1506, 1508 of system 1500 each include four sockets, according to further embodiments the socket servers 1502, 1504, 1506, 1508 of system 1500 may include two sockets, eight sockets, any number of sockets, etc., depending on the preferred embodiment and/or supporting chassis configuration.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   at least two socket servers each having a plurality of sockets, each socket being configured to receive a processor;
   each of the socket servers having at least one serial computer expansion bus coupled to each of the sockets thereof; and
   a plurality of adapters, each adapter being coupled directly to a respective one of the serial computer expansion buses, the adapters being configured to enable communication between the processors of different ones of the socket servers.

2. The system as recited in claim 1, comprising logic configured to assign a first address range to each of the socket servers and a second address range to each of the adapters, the second address range being different than the first address range.

3. The system as recited in claim 2, wherein the second address range is the same for all of the adapters.

4. A system, comprising
   at least two socket servers each having a plurality of sockets, each socket being configured to receive a processor;
   each of the socket servers having at least one serial computer expansion bus coupled to each of the sockets thereof; and
   a plurality of adapters coupled to the serial computer expansion buses, the adapters being configured to enable communication between the processors of different ones of the socket servers,
   wherein a first address range is assigned to each of the socket servers, wherein a second address range is assigned to each of the adapters, the second address range being different than the first address range, and comprising logic configured to group the sockets into subgroups, a unique one of the adapters being associated with each subgroup, wherein each socket server is configured to direct an access in the second address range by one of the processors in one of the subgroups to the adapter associated with the subgroup.

5. The system as recited in claim 4, wherein the second address range is the same for all of the adapters.

6. The system as recited in claim 1, comprising memory modules coupled directly to the socket servers, wherein one of the socket servers is configured to store a memory dump for memory channel storage dump backups, wherein a copy of the memory dump is stored on another of the socket servers.

7. The system as recited in claim 1, wherein the serial computer expansion buses having the adapters coupled thereto are Peripheral Component Interconnect Express (PCIe) slots, wherein each of the PCIe slots is coupled directly to an associated one of the sockets.

8. The system as recited in claim 1, comprising a plurality of processors coupled to the sockets.

9. The system as recited in claim 1, comprising cables coupling the adapters of the different ones of the socket servers together.

10. The system as recited in claim 1, wherein the socket servers have identical physical address ranges.

11. The system as recited in claim 1, comprising logic, configured to cause multiple processors to communicate with a single local adapter.

12. The system as recited in claim 1, wherein at least three socket servers are present.

13. The system as recited in claim 12, wherein the socket servers have identical physical address ranges.

14. The system as recited in claim 1, wherein a number of adapters directly coupled to each socket server is less than a number of sockets of the respective socket server.

15. A system, comprising:
   at least two socket servers each having a plurality of sockets, each socket being configured to receive a processor;
   each of the socket servers having at least one serial computer expansion bus coupled to each of the sockets thereof; and
   a plurality of adapters coupled to the serial computer expansion buses, the adapters being configured to enable communication between the processors of different ones of the socket servers,
   wherein a first address range is assigned to each of the socket servers,
   wherein a second address range is assigned to each of the adapters, the second address range being different than the first address range,
   wherein the socket servers have identical physical address ranges.

16. The system as recited in claim 15, comprising a plurality of processors coupled to the sockets.

17. The system as recited in claim 15, comprising logic, configured to cause multiple processors to communicate with a single local adapter.

18. The system as recited in claim 15, wherein at least three socket servers are present, wherein each of the serial computer expansion buses having one of the adapters coupled thereto is directly coupled to an associated one of the sockets.

19. The system as recited in claim 15, wherein a number of adapters directly coupled to each socket server is less than a number of sockets of the respective socket server.

20. The system as recited in claim 15, wherein the second address range is the same for all of the adapters for establishing decode address windows, wherein decoding tasks of the decode address windows are performed by socket server subgroupings.

* * * * *